(12) United States Patent
Evans et al.

(10) Patent No.: US 12,130,465 B2
(45) Date of Patent: Oct. 29, 2024

(54) VARIABLE HEIGHT SLANTED GRATING METHOD

(71) Applicant: Applied Materials, Inc., Santa Clara, CA (US)

(72) Inventors: Morgan Evans, Manchester, MA (US); Rutger Meyer Timmerman Thijssen, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/948,062

(22) Filed: Sep. 19, 2022

(65) Prior Publication Data
US 2023/0010821 A1    Jan. 12, 2023

Related U.S. Application Data

(63) Continuation of application No. 17/257,767, filed as application No. PCT/US2019/040183 on Jul. 1, 2019, now Pat. No. 11,480,724.

(60) Provisional application No. 62/700,756, filed on Jul. 19, 2018.

(51) Int. Cl.
  *G02B 5/18*      (2006.01)
  *F21V 8/00*      (2006.01)
  *G02B 27/01*     (2006.01)

(52) U.S. Cl.
  CPC ......... *G02B 6/0045* (2013.01); *G02B 5/1828* (2013.01); *G02B 5/1857* (2013.01); *G02B 6/0016* (2013.01); *G02B 6/0033* (2013.01); *G02B 6/0065* (2013.01); *G02B 27/0172* (2013.01)

(58) Field of Classification Search
  CPC .. G02B 6/0016; G02B 6/0045; G02B 6/0035; G02B 6/0043
  See application file for complete search history.

(56) References Cited

U.S. PATENT DOCUMENTS

| | | | |
|---|---|---|---|
| 5,907,436 A | 5/1999 | Perry et al. | |
| 6,545,808 B1 | 4/2003 | Ehbets et al. | |
| 8,160,411 B2 | 4/2012 | Levola et al. | |
| 9,557,458 B2 * | 1/2017 | Lutolf | G02B 5/1814 |
| 9,753,226 B2 * | 9/2017 | Frish | G02B 6/3628 |
| 2007/0263973 A1 | 11/2007 | Van Laere et al. | |

(Continued)

FOREIGN PATENT DOCUMENTS

| CN | 102017064 A | 4/2011 |
|---|---|---|
| CN | 102147492 A | 8/2011 |

(Continued)

OTHER PUBLICATIONS

Korean Office Action dated May 3, 2023 for Application No. 10-2021-7004526.

(Continued)

*Primary Examiner* — Eric Wong
(74) *Attorney, Agent, or Firm* — Patterson + Sheridan, LLP

(57) ABSTRACT

An apparatus with a grating structure and a method for forming the same are disclosed. The grating structure includes forming a recess in a grating layer. A plurality of channels is formed in the grating layer to define slanted grating structures therein. The recess and the slanted grating structures are formed using a selective etch process.

9 Claims, 10 Drawing Sheets

(56) References Cited

U.S. PATENT DOCUMENTS

| | | | |
|---|---|---|---|
| 2008/0225393 A1* | 9/2008 | Rinko | G02B 6/0036 |
| | | | 359/571 |
| 2009/0290217 A1 | 11/2009 | Hoose | |
| 2010/0321781 A1 | 12/2010 | Levola et al. | |
| 2011/0038049 A1* | 2/2011 | Vallius | G02B 5/1809 |
| | | | 703/2 |
| 2016/0033697 A1 | 2/2016 | Sainiemi et al. | |
| 2016/0033784 A1 | 2/2016 | Levola et al. | |
| 2016/0035539 A1 | 2/2016 | Sainiemi et al. | |
| 2017/0003504 A1 | 1/2017 | Vallius et al. | |
| 2017/0031171 A1* | 2/2017 | Vallius | G02B 5/1819 |
| 2017/0307886 A1 | 10/2017 | Stenberg et al. | |
| 2017/0307887 A1* | 10/2017 | Stenberg | G02B 26/0808 |
| 2018/0090296 A1 | 3/2018 | Neil et al. | |
| 2018/0095201 A1 | 4/2018 | Melli et al. | |
| 2019/0258008 A1* | 8/2019 | Hautala | G02B 27/4272 |
| 2021/0199971 A1* | 7/2021 | Lee | G02B 27/0172 |

FOREIGN PATENT DOCUMENTS

| | | |
|---|---|---|
| CN | 103901516 A | 7/2014 |
| CN | 102269833 B | 7/2016 |
| CN | 108152875 A | 6/2018 |
| CN | 110036317 A | 7/2019 |
| EP | 1635198 A1 | 3/2006 |
| JP | H3-246510 A | 11/1991 |
| JP | 200679096 A | 3/2006 |
| JP | 2008218867 A | 9/2008 |
| JP | 2016541125 A | 12/2016 |
| WO | 2015129223 A1 | 9/2015 |

OTHER PUBLICATIONS

International Search Report and Written Opinion, PCT/US2019/040183, Oct. 25, 2019.
Taiwan Office Action dated Apr. 1, 2021, for Taiwan Patent Application No. 108124244.
Japanese Office Action dated Jan. 4, 2022, for Japanese Patent Application No. 2021-500857.
EPO Supplementary European Search Report dated Mar. 22, 2022, for European Application No. 19837506.5.
Chinese Office Action dated Mar. 1, 2022, for Chinese Patent Application No. 201980047037.0.
Taiwan Office Action dated May 4, 2022, for Taiwan Patent Application No. 110138995.
Japanese Office Action dated Aug. 2, 2022, for Japanese Patent Application No. 2021-500857.
Chinese Office Action dated Aug. 12, 2022, for Chinese Patent Application No. 201980047037.0.
Korean Office Action dated Nov. 15, 2022, for Korean Patent Application No. 10-2021-7004526.
Japanese Office Action dated Jan. 31, 2023, for Japanese Patent Application No. 2021-500857.
Taiwan Office Action dated Feb. 3, 2023, for Taiwan Patent Application No. 110138995.
Office Action dated Apr. 23, 2024, for Japanese Patent Application No. 2023-089554.
EPO Extended European Search Report dated Jul. 5, 2024, for European Application No. 24176444.8.

* cited by examiner

VARIABLE HEIGHT SLANTED GRATING METHOD

CROSS-REFERENCE TO RELATED APPLICATIONS

This application is a continuation of U.S. nonprovisional patent application Ser. No. 17/257,767, filed on Jan. 4, 2021, which is a 371 of International application number PCT/US2019/040183 filed Jul. 1, 2019, which claims benefit of U.S. provisional patent application Ser. No. 62/700,756, filed Jul. 19, 2018, each of which is herein incorporated by reference in its entirety.

BACKGROUND

Field

Embodiments of the present disclosure generally relate to a method and apparatus for use in a display apparatus. More specifically, the disclosure relates to a grating structure for use in a waveguide.

Description of the Related Art

Virtual reality is generally considered to be a computer-generated simulated environment in which a user has an apparent physical presence. A virtual reality experience can be generated in 3D and viewed with a head-mounted display (HMD), such as glasses or other wearable display devices that have near-eye display panels as lenses, to display a virtual environment replacing an actual environment.

Augmented reality, however, enables an experience in which a user can still see through the display lenses of the glasses or other HMD device to view the actual surrounding environment, yet also see images of virtual objects that are generated for display and appear as part of the actual environment. Augmented reality can include any type of input, such as audio and haptic inputs, as well as virtual images and video, that enhances or augments the environment that the user experiences. As an emerging technology, there are many challenges and design constraints with augmented reality.

One such challenge is displaying a virtual image overlaid on an ambient environment while having sufficient clarity from various user viewing perspectives. For example, if a user's eye is not precisely aligned with the virtual image being displayed, the user may see a distorted, unclear image or may not be able to view the image entirely. Moreover, the image may be blurry and have less than desirable resolution from a non-optimal viewing angle.

Therefore, there is a need for improved methods of manufacturing augmented reality display devices.

SUMMARY

The present disclosure generally relates to a method and apparatus for use in a display apparatus. More specifically, the disclosure relates to a grating structure for use in a waveguide.

In one embodiment, a structure for use in a waveguide is provided. The structure has a substrate with a grating layer thereon. A recess is formed in the grating layer with a first end and a second end. The recess has a depth that changes from the first end to the second end. A plurality of channels is formed in the grating layer. Each channel partially defines a portion of a plurality of grating structures. The plurality of grating structures also has a depth changes from the first end to the second end defined by the recess.

In another embodiment, a structure for use in a waveguide is provided. The structure includes a substrate with a grating layer thereon. A recess is formed in the grating layer in a first direction and a second direction. The recess has a depth that changes in the first direction and the second direction defining a three dimensional shape. A plurality of channels is formed in the grating layer. Each channel partially defines a portion of a plurality of grating structures. The plurality of grating structures also has a depth that changes in the first direction and the second direction as defined by the recess.

In yet another embodiment, a method of forming a grating structure is provided. The method includes forming a recess in a grating layer, forming a hardmask and a photoresist stack over the grating layer, etching the photoresist stack, and forming a plurality of grating structures in the grating layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

An apparatus with a grating structure and a method for forming the same are disclosed. The grating structure includes a recess in a grating layer. A plurality of channels is formed in the grating layer to define slanted grating structures therein. The recess and the slanted grating structures are formed using a selective etch process.

Figure 1:
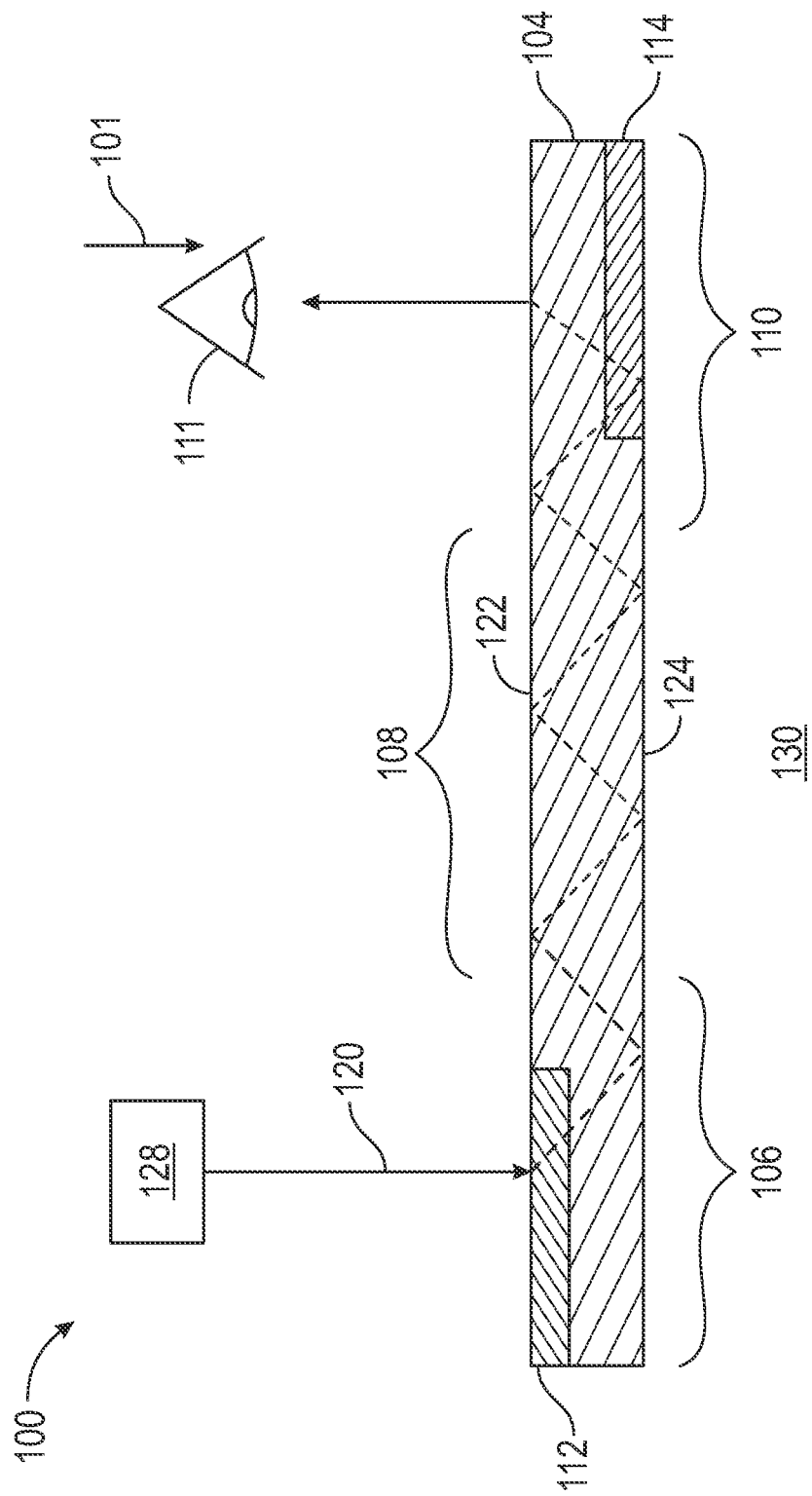
FIG. 1 is a schematic, cross-sectional view of a display apparatus according to one embodiment described herein.

FIG. 1 is a schematic, cross-sectional view of a waveguide 104 implemented in a display apparatus 100. The display apparatus 100 is configured for augmented, virtual, and mixed or merged reality applications as well as other display applications such as handheld display devices.

The display apparatus 100 utilizes the waveguide 104 for see-through viewing of an ambient environment 130 through the waveguide 104, such as for a user viewing the ambient environment 130 from a user perspective 101. When implemented in the display apparatus 100, a first surface 122 of the waveguide 104 is disposed adjacent to, and facing, a user's eye 111. A second surface 124 of the waveguide 104 is disposed opposite the first surface 122 and adjacent to and facing the ambient environment 130. Although illustrated as being planar, it is contemplated that the waveguide 104 may be curved or angled, depending upon the desired application.

The display apparatus 100 further includes an image microdisplay 128 to direct light beams 120 of a generated, virtual image into the waveguide 104. The light beams 120 of the virtual image are propagated in the waveguide 104. Generally, the waveguide 104 includes an input coupling region 106, a waveguide region 108, and an output coupling region 110. The input coupling region 106 receives the light beams 120 (a virtual image) from the image microdisplay 128 and the light beams 120 travel through the waveguide region 108 to the output coupling region 110 where the user's perspective 101 and field of view enable visualization of the virtual image overlaid on the ambient environment 130. The image microdisplay 128 is a high resolution display generator, such as a liquid crystal on silicon microdisplay, which projects the light beams 120 of the virtual image into the waveguide 104.

The waveguide 104 includes input grating structures 112 and output grating structures 114. The input grating structures 112 are formed on the waveguide 104 in an area corresponding to the input coupling region 106. The output grating structures 114 are formed on the waveguide 104 in an area corresponding to the output coupling region 110. The input grating structures 112 and output grating structures 114 influence light propagation within the waveguide 104. For example, the input grating structure 112 couples in light, such as the light beams 120, from the image microdisplay 128 and the output grating structure couples out the light to the user's eye 111.

For example, the input grating structures 112 influence the field of view of the virtual image displayed at the user's eye 111. The output grating structures 114 influence the amount of the light beams 120 collected and outcoupled from the waveguide 104. In addition, the output grating structures 114 modulate the field of view of a virtual image from a user's perspective 101 and increase the viewing angle from which a user can view the virtual image from the image microdisplay 128. In another example, a grating structure (not shown) is also formed in the waveguide region 108 between the input coupling region 106 and the output coupling region 110. Additionally, multiple waveguides 104, each with desired grating structures formed therein, can be used to form the display apparatus 100.

Figure 2:
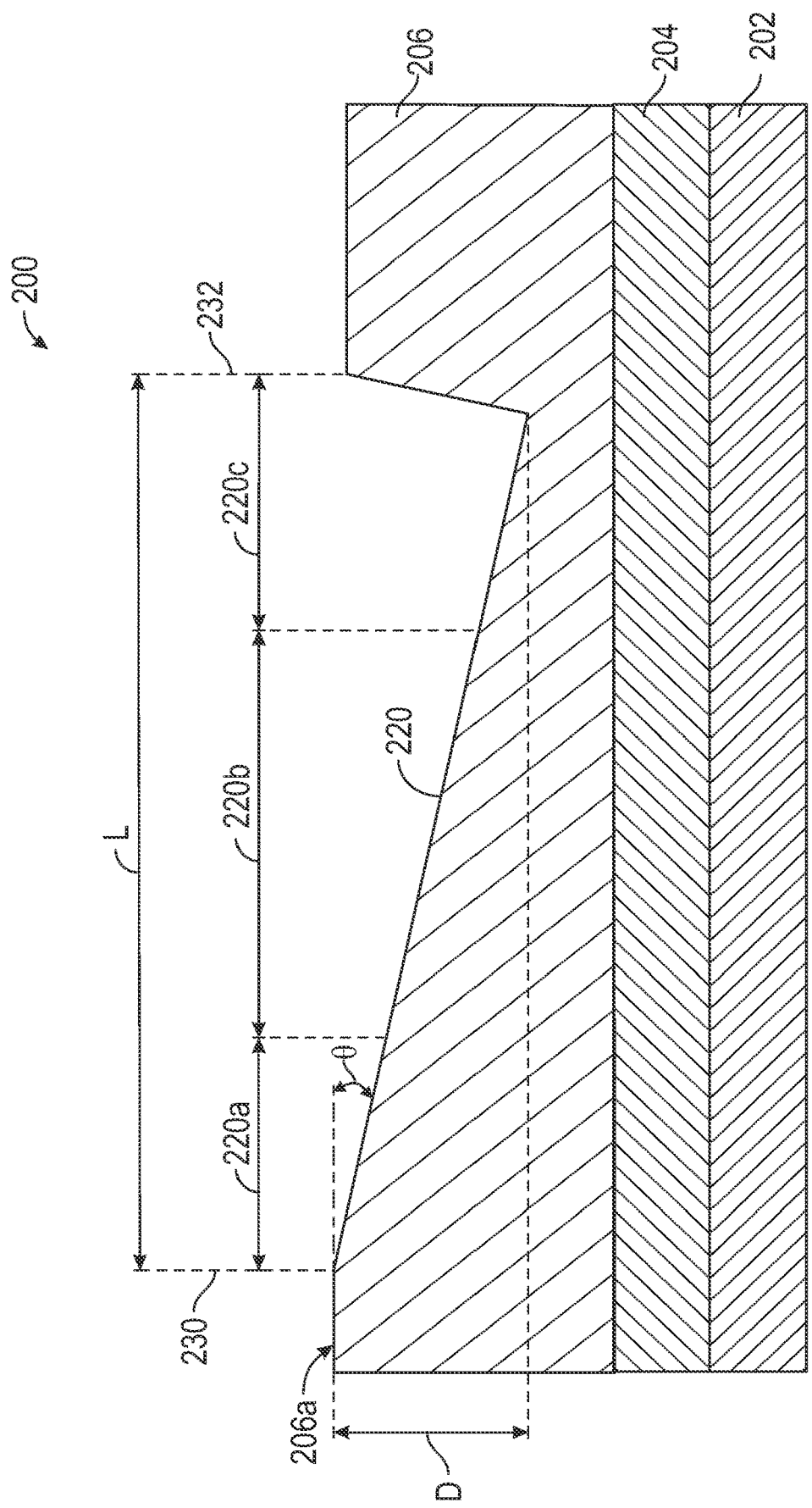
FIG. 2 is a sectional enlargement of a portion of a waveguide having a wedge-shaped recessed structure formed therein according to one embodiment described herein.

FIG. 2 is an enlarged portion, in cross-section, of a waveguide 200 for forming grating structures 280 (FIG. 5) therein. In this example, the waveguide 200 has a substrate 202 with an etch stop layer 204 formed thereon. The substrate 202 is made from an optically transparent material, such as silicon. The etch stop layer 204 is formed over the substrate 202. The etch stop layer 204 is formed, for example, by a chemical vapor deposition (CVD) process, a physical vapor deposition (PVD) process, or a spin-on process. The etch stop layer 204 is formed from a material, such as titanium nitride or tantalum nitride, among others, which is resistant to an etch process.

A grating layer 206 is formed over the etch stop layer 204. The grating layer 206 is formed from an optically transparent material. In one example, the grating layer 206 is formed from a silicon-based material, such as silicon nitride or silicon oxide, or a titanium-based material, such as titanium oxide. The material of the grating layer 206 has a high refractive index, such as about 1.3 or higher, for example 1.5, or even higher. Generally, the grating layer 206 has a thickness of less than about 1 micrometer, such as between about 150 nm and about 700 nm. For example, the grating layer 206 has a thickness of between about 200 nm and bout 600 nm, such as between about 300 nm and about 500 nm, such as about 400 nm.

After the grating layer 206 is formed, a recess 220 is formed therein. The recess 220 may be any suitable recessed structure and shape, including but not limited to a wedge-like shape, a frustum-like shape, a conical shape, or the like. As depicted in FIG. 2, the recess 220 has a planar and scalene wedge-like structure with a length L between a first end 230 and a second end 232. A depth D of recess 220 increases from the first end 230 to the second end 232. That is, the depth D of the recess 220 is minimal at the first end 230 and maximum at the second end 232. The depth D is within a range of about 0 nm to about 700 nm, such as between about 100 nm to about 600 nm, such as between about 200 nm and about 500. For example, the depth D is between about 300 nm and about 400 nm, such as about 350 nm. In the embodiment of FIG. 2, the length L is substantially larger compared to the depth D. For example, the length L is about 25 mm while the depth D at the first end 230 is between about 0 nm to about 50 nm and the depth D at the second end 232 is between about 250 nm to about 700 nm. Accordingly, the recess 220 has a substantially shallow slope shown as an angle Θ measured between a surface of the recess 220 and a plane defined by a surface 206a of the grating layer 206. In this example, the angle Θ is less than 1 degree, such as less than 0.1 degrees, like about 0.0005 degrees. The slope of the recess 220 is illustrated herein with an exaggerated angle Θ for clarity.

In one example, the recess 220 is formed by selectively etching areas of the grating layer 206. For example, a first portion 220a of the recess 220 is formed by etching the grating layer 206 at a low etch rate and/or low power. A second portion 220b is formed by etching the grating layer 206 at an increased etch rate and/or power than the portion 220a. Similarly, a third portion 220c is formed by etching the grating layer 206 at a higher etch rate and/or power than the portions 220a, 220b. Here, three portions are used for illustrative purposes. However, any desirable number of portions may be used to form the recess 220 and etched in a single operation step or multiple steps. Additionally, the etching may occur at smoothly increasing intervals (i.e., etching rate and/or power) so that the recess 220 has a smooth surface. In one example, an area for the grating structures 280 is defined prior to formation of the recess 220, such as by using a mask (e.g., a photolithography mask or proximity mask) or an etching beam. Forming the recess 220 with a smooth contour improves image quality by better controlling diffraction and projection of light beams compared to a rough (i.e., stepwise or the like) structure. Thus, the power of the light outcoupled across the grating structures 280 is significantly more uniform.

Figure 3:
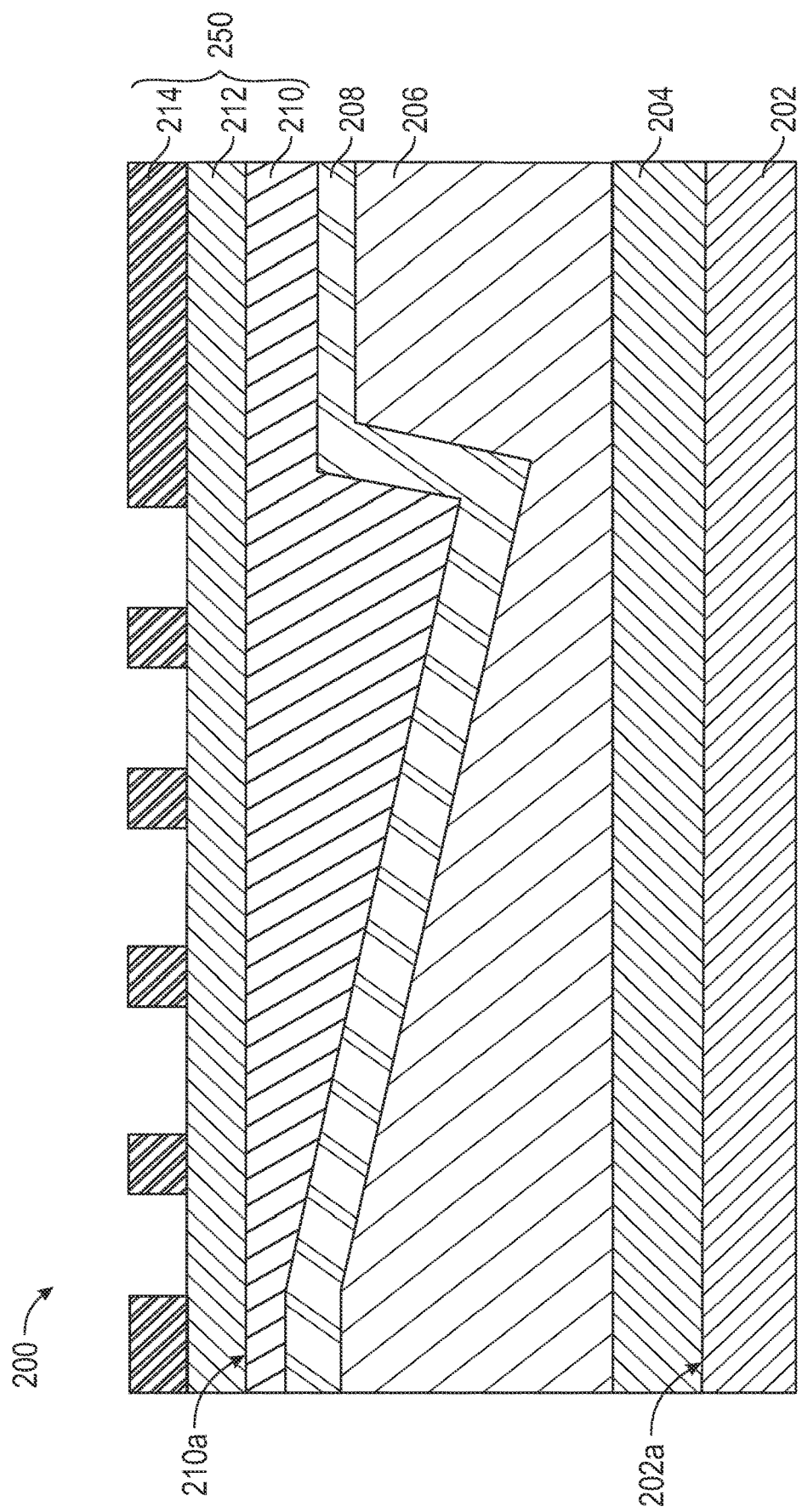
FIG. 3 is a cross-sectional enlargement of the waveguide of FIG. 2 having a photoresist stack formed thereon.

FIG. 3 is a section of the waveguide 200 having a photoresist stack 250 formed thereon. A conformal hardmask 208 is formed over the grating layer 206. The hardmask 208 is, for example, formed from titanium nitride using a chemical vapor deposition process. In one example, the hardmask 208 has a thickness between about 30 nm and about 50 nm, such as between about 35 nm and about 45 nm. The photoresist stack 250 includes a back anti-reflective coating (BARC) 210, a silicon anti-reflective coating (SiARC) 212, and a photoresist 214. The BARC 210 is formed using a spin-on process so that an upper surface 210a of the BARC 210 is substantially planar (i.e., parallel to a surface 202a of the substrate 202). By using the spin-on process to form the BARC 210, an etch process or a polishing process is not needed to planarize the BARC 210 which eliminates the potential to over-etch or damage the thin BARC 210 and/or the underlying grating layer 206.

Next, the SiARC 212 is formed over the BARC 210. The SiARC 212 is formed from a silicon-based material using, for example, a chemical vapor deposition process or a spin-on process. The photoresist 214 is formed over the SiARC 212. The photoresist 214 is formed from a polymeric material using, for example, a lithography process. In one example, the photoresist 214 is formed using a spin-on coating, exposing one or more grating lines, and developing the photoresist 214. After formation of the photoresist 214, the photoresist stack 250 is patterned using an etch process. It is understood that patterning with the BARC 210 and the SiARC 212 is an exemplary method. Other methods of patterning may be used herewith. The patterning method is generally selected in relation to the size and shape of the structure to be patterned.

Figure 4:
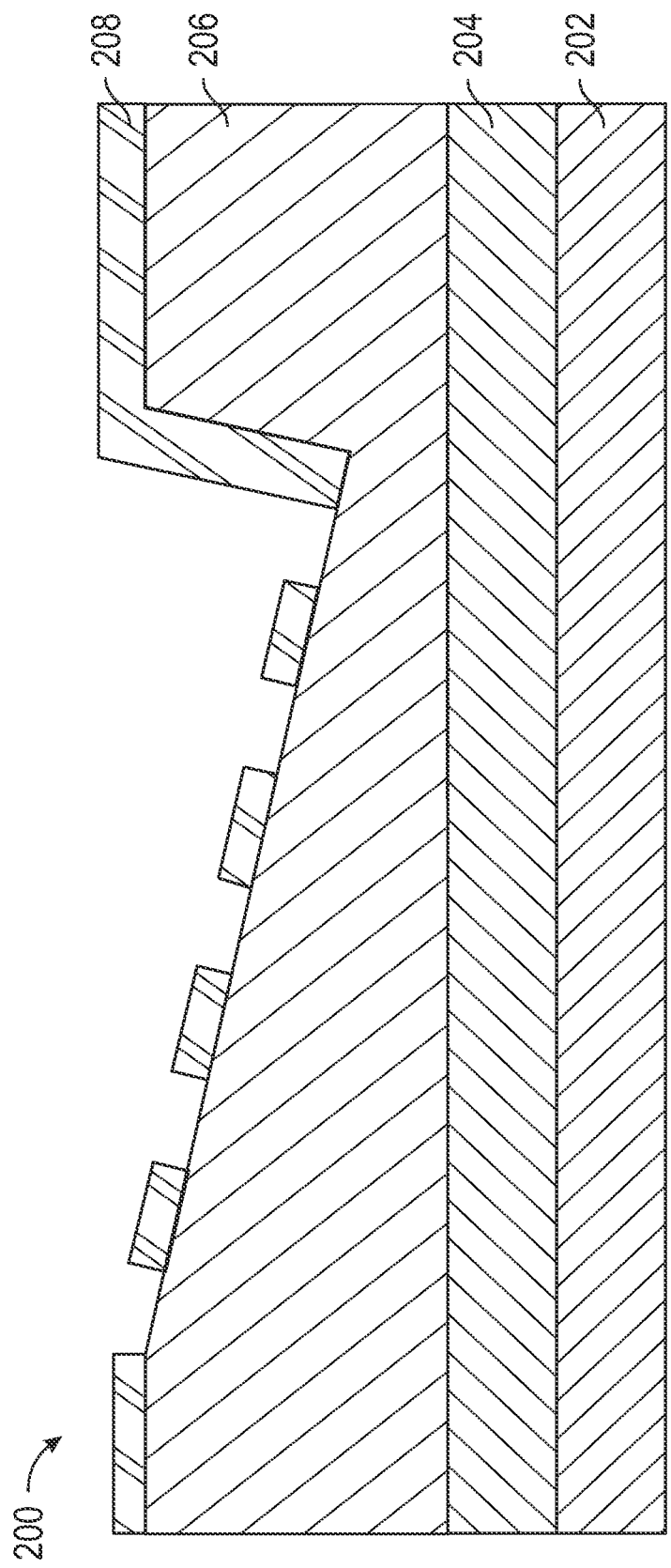
FIG. 4 is a cross-sectional enlargement of the waveguide of FIG. 3 with a patterned hardmask formed thereon.

FIG. 4 is a cross-section of the waveguide 200 after etching and removal of the photoresist stack 250 of FIG. 3. Etching the photoresist stack 250 patterns the hardmask 208 as shown in FIG. 4. The hardmask 208 functions as a pattern guide for formation of the slanted grating structures 280 shown in FIG. 5. The slanted grating structures 280 are defined between one or more channels 270 formed within the grating layer 206. In order to form the channels 270, the grating layer 206 is again etched using a selective etch process. In one example, the slanted grating structures 280 are formed using a process similar to the process utilized to form the wedge-shaped recess 220, but in an opposite sequence. For example, the area corresponding to the third portion 220c is etched at a low etch rate and/or low power. The area corresponding to the second portion 220b is etched at a higher etch rate and/or power than the third portion 220c. The area corresponding to the first portion 220a is etched at a higher etch rate and/or power than the portions 220b, 220c. In one example, the etch stop layer 204 is etched to improve the definition of the slanted grating structures 280. After the slanted grating structures 280 are formed, the hardmask 208 is optionally removed using an etch process.

Figure 5:
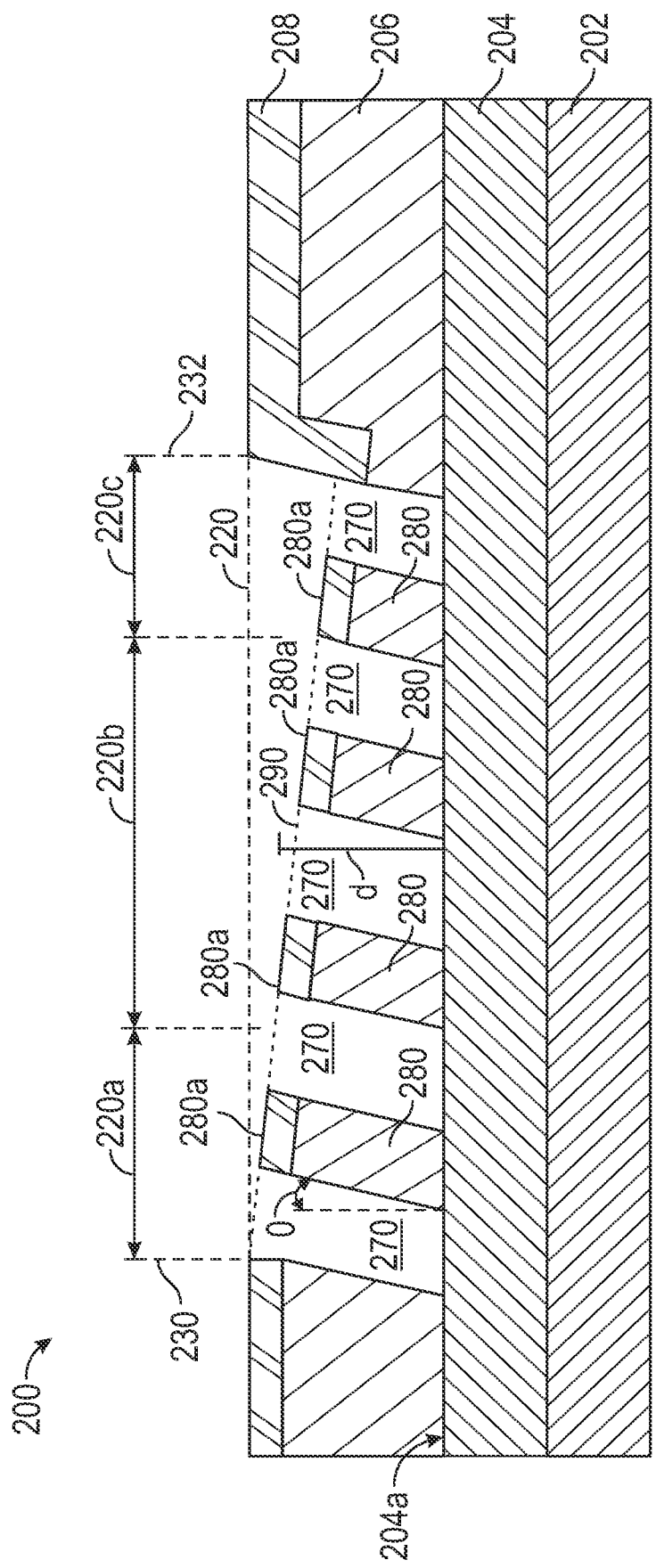
FIG. 5 is a cross-sectional enlargement of the waveguide of FIG. 4 with grating structures formed therein.

Each slanted grating structure 280 is formed having a depth d. For example, the slanted grating structures 280 can have depth d between about 5 nm and about 700 nm, such as between about 100 nm and about 600 nm, such as about 500 nm. The depth of the slanted grating structures 280 is selected depending on desired wavelengths (i.e., color) for projection of an image to a user. In the embodiment of FIG. 5, the depth d of the slanted grating structures decreases from the first end 230 to the second end 232 of the recess 220 (shown in phantom). The upper surfaces 280a of each slanted grating structure 280 define an angled plane 290 which corresponds to the slope of the recess 220. Additionally, each slanted grating structure 280 can have an angle Φ measured relative to a plane that is normal to the surface 204a of the etch stop layer 204. The angle Φ is, for example, between about 0 degrees and about 70 degrees, such as between about 25 degrees and about 45 degrees, such as about 35 degrees. By forming the slanted grating structures 280 as described herein, the clarity of an image projected by the waveguide 200 is substantially improved due to improved diffraction and projection of light towards a desired image plane. By controlling the shape of the slanted grating structures 280, changes in the diffractions of different wavelengths (i.e., different colors) are controlled to improve the image quality. The optical efficiency (i.e., projection of desired wavelengths to a user's perspective) is greatly improved due to the increased control provided by the slanted grating structures 280. Further, the projection of undesired wavelengths is reduced thus increasing the clarity and quality of the projected image.

Figure 7A:
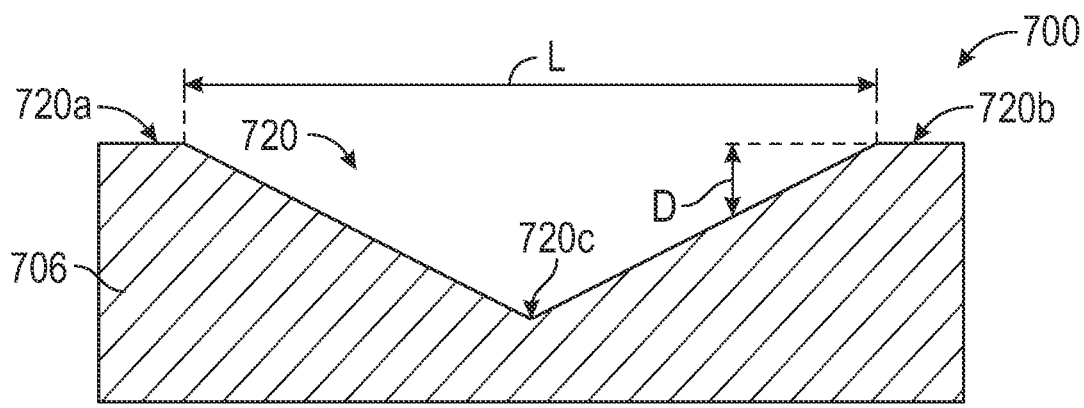
FIGS. 7A-7C are cross-sectional enlargements of examples of shapes of a recessed structure according to embodiments described herein.
Figure 7B:
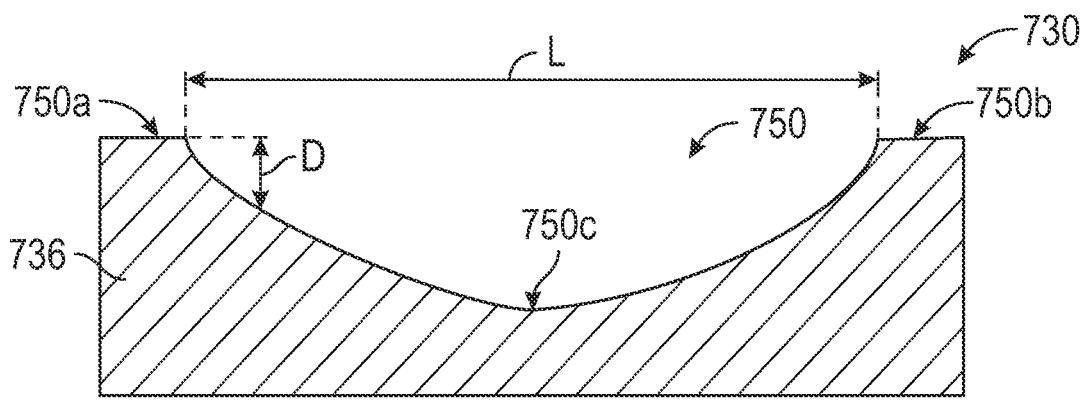
Figure 7C:
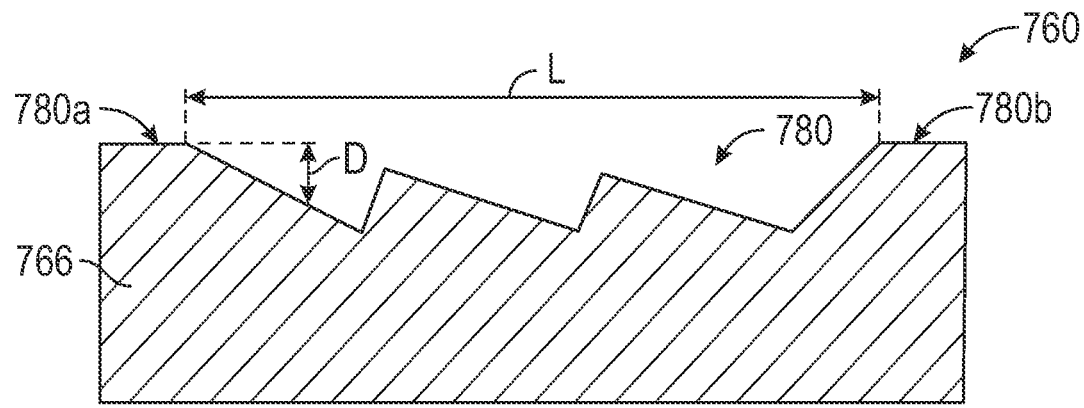

In FIGS. 2-5, the recess 220 is shown having a planar and scalene wedge-like shape. However, the etch process described herein advantageously allows the recess 220 to have a slope and/or curvature in one or more directions. Thus, the recess 220 may have any suitable shape, as described above. FIGS. 7A-7C illustrate other examples of shapes that can be used for the recess 220. For example, FIG. 7A illustrates a substantially isosceles triangle-like recess 720 in a grating layer 706 of a waveguide 700. The recess 720 has two planar sloped portions extending from respective peripheral regions 720a, 720b towards a central region 720c. FIG. 7B illustrates another recess 750 in a grating layer 736 of a waveguide 730. The recess 750 has a curved and concave structure with a shallow depth D at peripheral regions 750a, 750b and an increased depth at a central region 750c. In one example, the recess 750 has a parabolic shape. For example, the depth D increases non-linearly from the peripheral regions 750a, 750b to the central region 750c. FIG. 7C illustrates another recess 780 in a grating layer 766 of a waveguide 760. The recess 780 has a depth D that oscillates from a first end 780a to a second end 780b thus forming a pattern of cyclical depths D for the recess 780. The recess 780 is shown with linear, saw-tooth oscillations of the depth D. However, it is contemplated that the depth D can vary non-linearly so that the recess 220 has wave-like oscillations of the depth D. The depth D of a recess, such as recesses 720, 750, and 780, can change linearly or non-linearly across a length L thereof from a first end (i.e, 720a, 750a, 780a) to a second end (i.e., 720b, 750b, 780b).

Figure 8A:
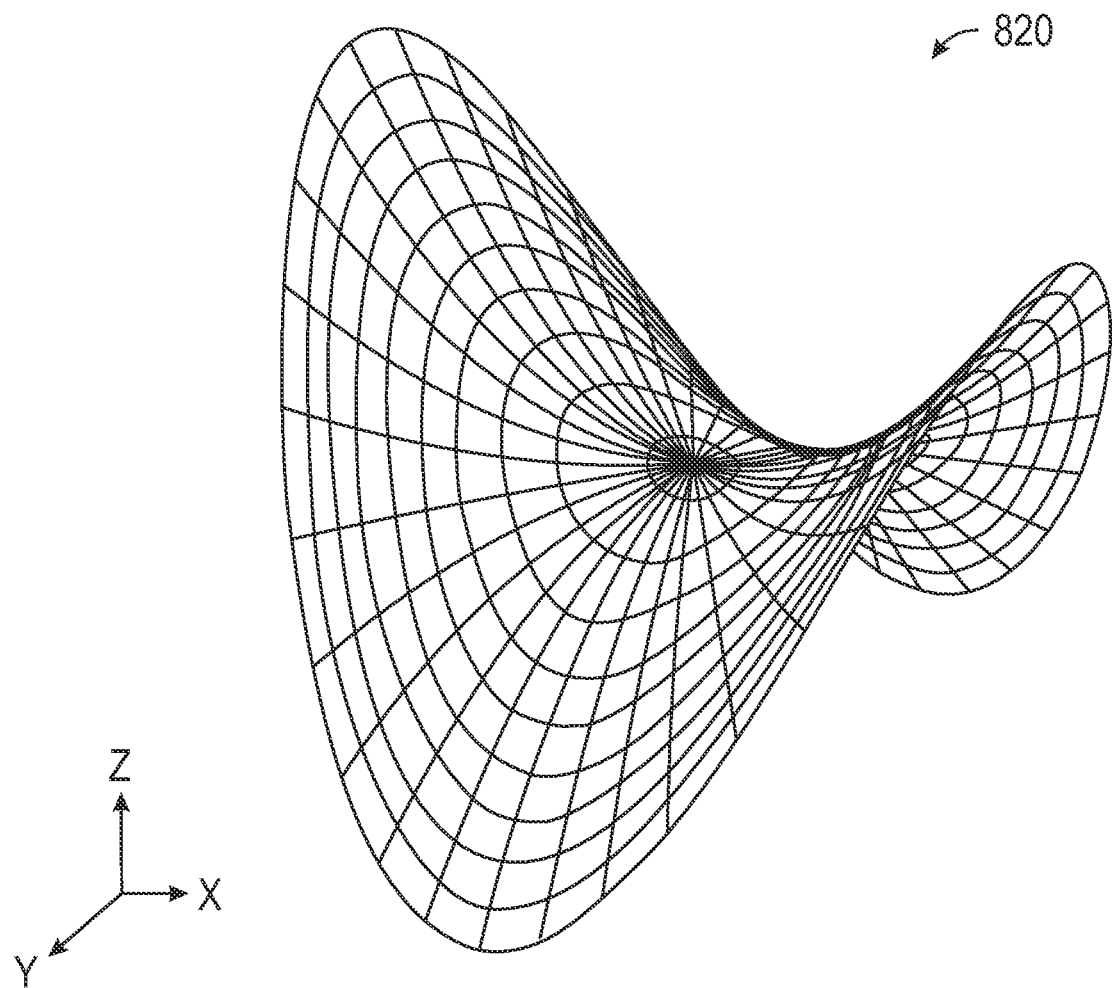
FIG. 8A-8C are perspective views of examples of three dimensional shapes of a recessed structure according to embodiments described herein.
Figure 8B:
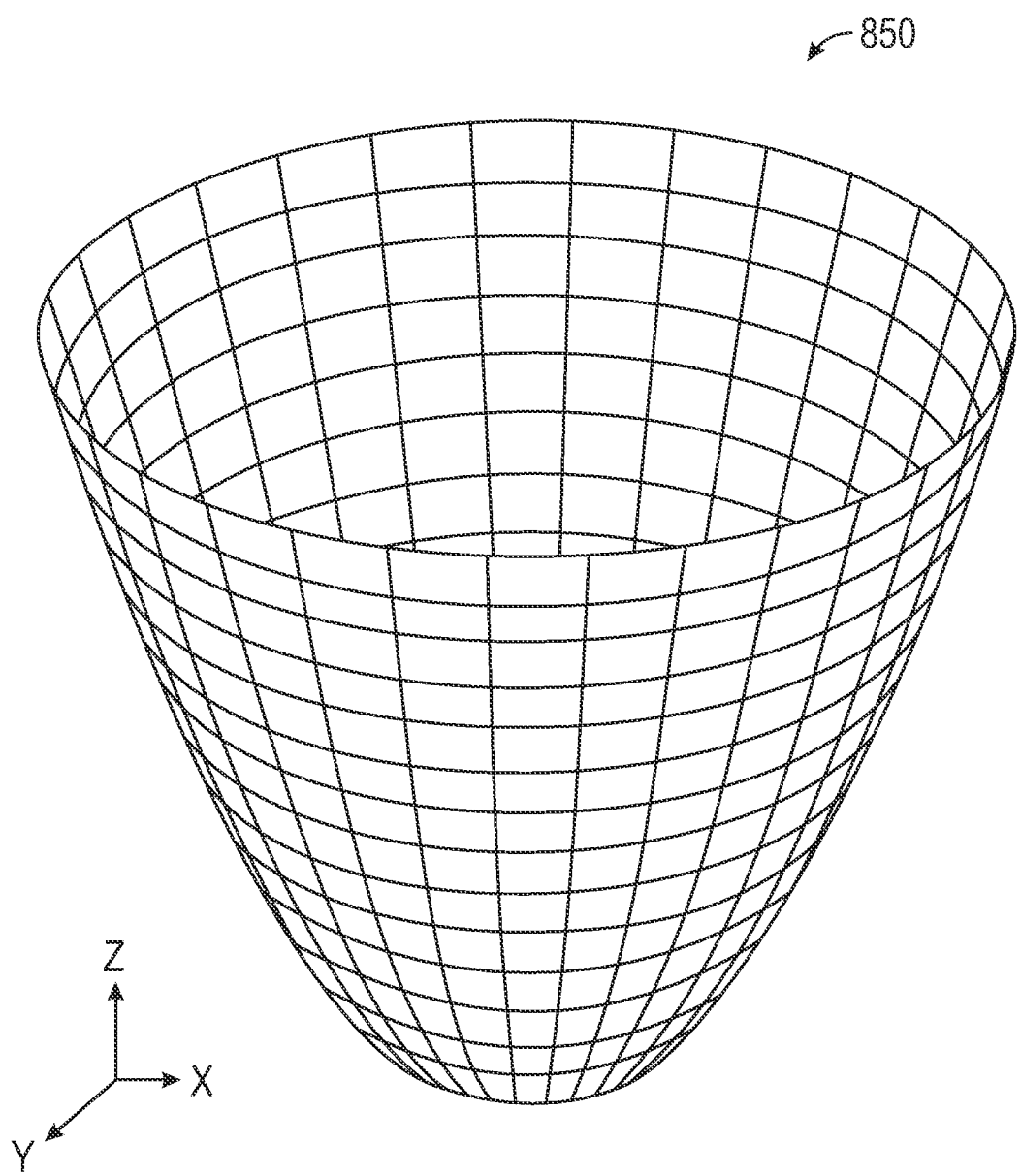
Figure 8C:
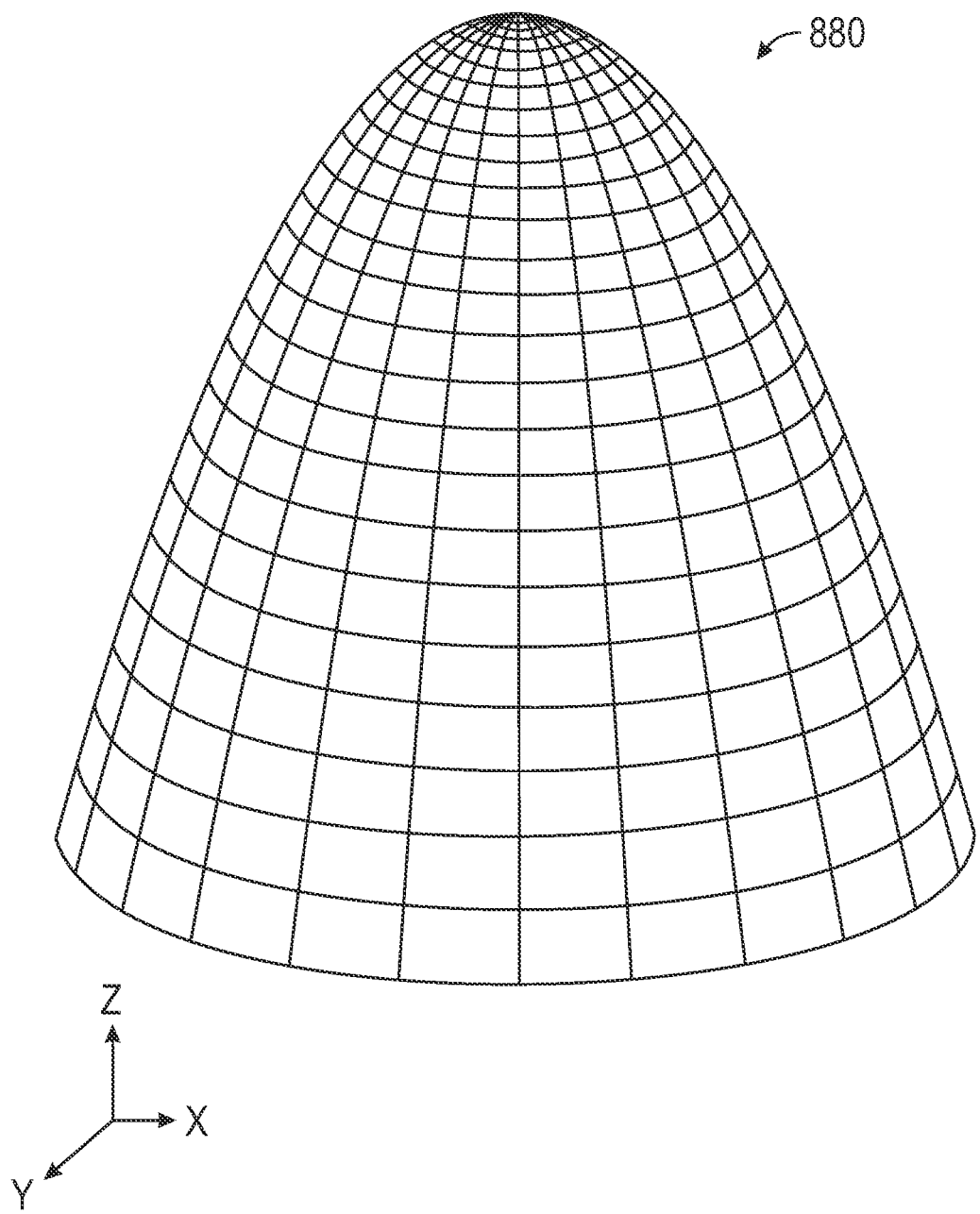

In another example, the recess 220 has a three dimensional shape. That is, the depth changes in more than one direction, such as in two directions (i.e., a first direction X and a second direction Y), as illustrated in the examples of FIGS. 8A-8C. FIG. 8A illustrates a recess 820 having a saddle-point shaped curvature (i.e., hyperbolic paraboloid shape). FIG. 8B illustrates a recess 850 having an elliptic paraboloid shape with positive curvature. FIG. 8C illustrates a recess 880 having an elliptic paraboloid shape with negative curvature. The three dimensional shape of the recess is not limited to the examples of FIGS. 8A-8C. Other desired shapes, for example a paraboloid in a square domain with positive curvature or negative curvature, an ellipsoid, and linear sloped shapes, among others, are also contemplated and can be used herewith. In these cases, the depth of the recess changes in both the X and Y directions. Thus, upper surfaces of the slanted grating structures, such as the upper surfaces 280a of FIG. 5, are curved as defined by the shape of the curvature of the recess. The shape and/or depth of the recess is not limited to changes in the X and Y directions. For example, the depth of the recess may change in three directions, in four directions, or even more directions. Additionally, though illustrated herein using a Cartesian coordinate system, the wedge-shaped structure may be formed using other coordinate systems, such as a polar coordinate system, a cylindrical coordinate system, or a spherical coordinate system. The embodiments herein may be advantageously used to form any desired shape for the recess.

Figure 6:
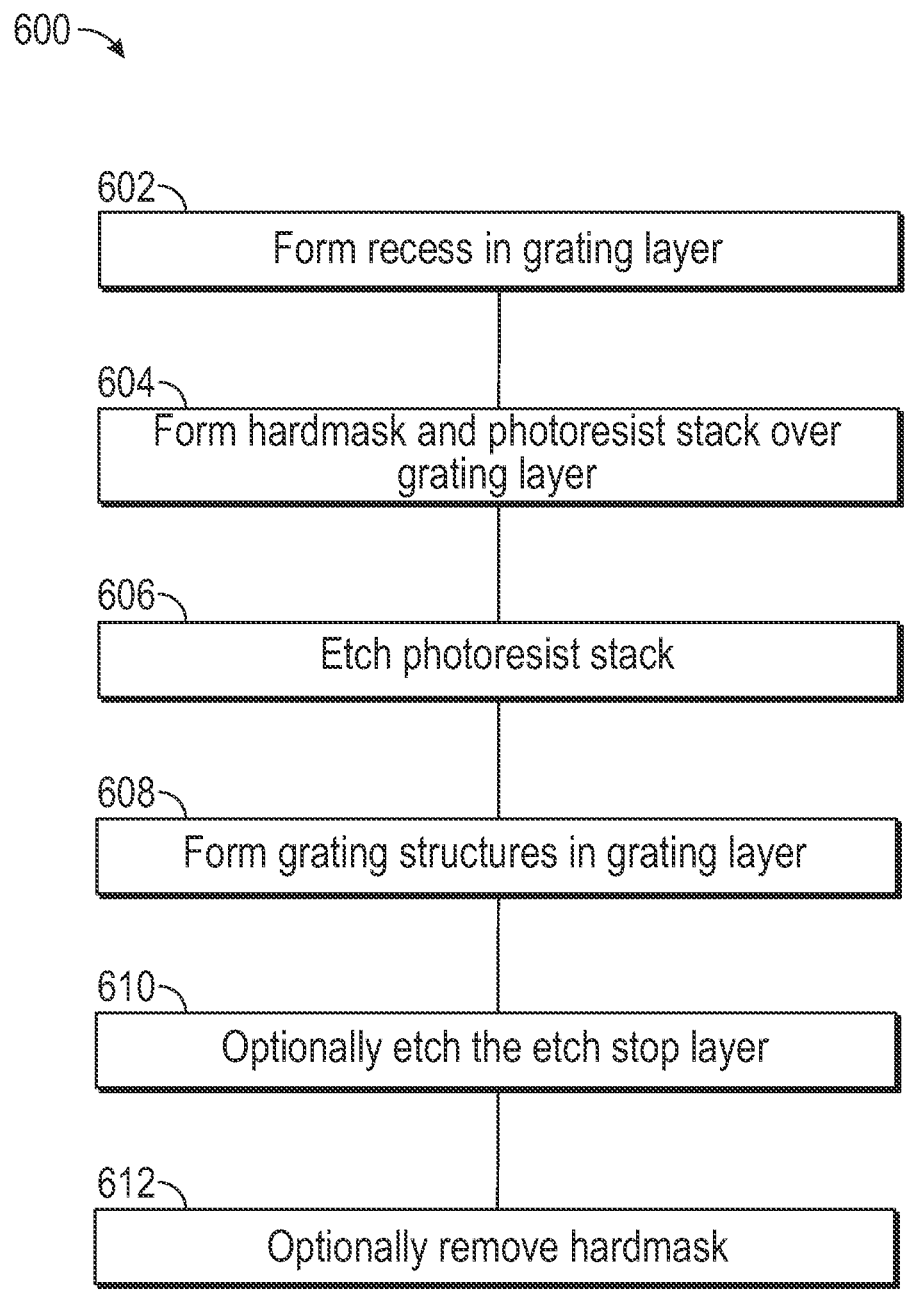
FIG. 6 is a flow chart of a method of manufacturing a waveguide according to one embodiment described herein.

FIG. 6 is a flow chart illustrating a method 600 for forming a grating structure in a waveguide, such as the slanted grating structures 280. The waveguide is generally formed on a substrate. In one example, the substrate is a silicon-based glass substrate with an optional etch stop layer and a grating layer formed thereon. In another example, the substrate is a glass substrate without an etch stop layer. In such cases, the substrate functions as the grating layer and the grating structures are formed directly in the substrate. At operation 602, a recess is formed in the grating layer above the optional etch stop layer. In one example, the recess is formed using an etch process which selectively processes areas of the substrate as described above. In operation 604, a conformal hardmask is deposited onto the grating layer. A photoresist stack including a back anti-reflective coating (BARC), a silicon anti-reflective coating (SiARC), and a photoresist is formed over the hardmask. The back anti-reflective coating is formed using a spin-on technique so that an upper surface of the layer is substantially planar.

At operation 606, the photoresist stack is etched to form a desired pattern on the hardmask. At operation 608, the hardmask and grating layer are etched using a selective etch process to form the grating structures in the grating layer as described above. At operation 610, the etch stop layer, when present, is optionally etched to improve the definition of the shape of the grating structures. At operation 612, the hardmask is optionally removed, for example, using an etching process.

By utilizing the embodiments described herein, a waveguide having slanted grating structures is formed. The slanted grating structures improve the function of the waveguide by better collecting and directing light passing through the waveguide, thus improving clarity of a projected image. The slanted grating structures provide increased control over the wavelengths of light projected to a desired image plane. The uniformity of the power of light outcoupled by the waveguide is significantly more uniform. The embodiments described herein further improve manufacturing of a waveguide by eliminating manufacturing processes, such as mechanical polishing, which can damage layers used to form the waveguide. Further, the embodiments described herein allow for a grating to have a two dimensional or a three dimensional shape which allow use of the waveguide in an increased range of applications.

While the foregoing is directed to embodiments of the present disclosure, other and further embodiments of the disclosure may be devised without departing from the basic scope thereof, and the scope thereof is determined by the claims that follow.

What is claimed is:

1. An optical device, comprising:
a substrate having an optically transparent grating layer disposed thereon;
a recess formed in the grating layer, the recess having a depth that changes from a first end of the recess to a second end of the recess; and
a plurality of grating structures formed in the grating layer below the recess and partially defining a portion of the recess, a depth of the plurality of grating structures changing from the first end to the second end, each of the plurality of grating structures are at an angle, the angle of each of the plurality of grating structures relative to a plane normal to the substrate is between about 25 degrees and 45 degrees, wherein each top surface of the plurality of grating structures is coplanar and defines a slope of a majority of the recess.

2. The optical device of claim 1, wherein the recess has a planar and scalene wedge-like shape.

3. The optical device of claim 2, wherein the depth of the plurality of grating structures changes linearly from the first end to the second end.

4. The optical device of claim 1, wherein the recess has a triangular shape.

5. An optical device, comprising:
a substrate having an optically transparent grating layer disposed thereon;
a recess formed in the grating layer, the recess having a depth that changes in a first direction and a second direction to define a three-dimensional shape; and
a plurality of grating structures formed in the grating layer below the recess and partially defining a portion of the recess, a depth of the plurality of grating structures changing in the first direction and the second direction, each of the plurality of grating structures are slanted at an angle, the angle of the slant of each of the plurality of grating structures relative to a plane normal to the substrate is between about 25 degrees and 45 degrees, wherein each top surface of the plurality of grating structures is coplanar and defines the slope of the recess.

6. The optical device of claim 5, wherein the recess has a negative slope.

7. The optical device of claim 6, wherein the recess has a second portion with a positive slope.

8. The optical device of claim 1, wherein the angle of each of the plurality of grating structures is substantially the same angle.

9. The optical device of claim 5, wherein the angle of each of the plurality of grating structures is substantially the same angle.

* * * * *